(12) United States Patent
Lu et al.

(10) Patent No.: US 11,481,325 B2
(45) Date of Patent: Oct. 25, 2022

(54) SECURE FAST REBOOT OF A VIRTUAL MACHINE

(71) Applicant: Citrix Systems, Inc., Fort Lauderdale, FL (US)

(72) Inventors: Yuhua Lu, Hollis, NH (US); Graham MacDonald, Bedford, NH (US); Lanyue Xu, Windham, NH (US); Roger Cruz, Boxboro, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 213 days.

(21) Appl. No.: 16/834,674

(22) Filed: Mar. 30, 2020

(65) Prior Publication Data
US 2021/0303469 A1    Sep. 30, 2021

(51) Int. Cl.
*G06F 12/0811*    (2016.01)
*G06F 9/455*    (2018.01)
*G06F 9/50*    (2006.01)
*G06F 12/0891*    (2016.01)

(52) U.S. Cl.
CPC ...... *G06F 12/0811* (2013.01); *G06F 9/45558* (2013.01); *G06F 9/5016* (2013.01); *G06F 12/0891* (2013.01); *G06F 2009/45562* (2013.01); *G06F 2009/45583* (2013.01); *G06F 2009/45595* (2013.01)

(58) Field of Classification Search
CPC ............. G06F 12/0811; G06F 9/45558; G06F 9/5016; G06F 12/0891; G06F 2009/45562; G06F 2009/45583; G06F 2009/45595; G06F 9/4406; G06F 2009/45575; G06F 2212/151; G06F 2212/6042; G06F 12/0804; G06F 12/0842; G06F 12/0871; G06F 12/0866
See application file for complete search history.

(56) References Cited

U.S. PATENT DOCUMENTS

| 2014/0032850 A1* | 1/2014 | Phelan ................ G06F 12/0873 711/135 |
| 2014/0068183 A1 | 3/2014 | Joshi et al. |
| 2014/0095821 A1* | 4/2014 | Yang ................... G06F 11/1407 711/162 |

(Continued)

OTHER PUBLICATIONS

Extended European Search Report issued for European Application No. 21164669.0, dated Sep. 8, 2021 (9 pages).

*Primary Examiner* — Sean D Rossiter
(74) *Attorney, Agent, or Firm* — Finch & Maloney PLLC

(57) ABSTRACT

A system for managing a virtual machine is provided. The system includes a processor configured to initiate a session for accessing a virtual machine by accessing an operating system image from a system disk and monitor read and write requests generated during the session. The processor is further configured to write any requested information to at least one of a memory cache and a write back cache located separately from the system disk and read the operating system image content from at least one of the system disk and a host cache operably coupled between the system disk and the at least one processor. Upon completion of the computing session, the processor is configured to clear the memory cache, clear the write back cache, and reboot the virtual machine using the operating system image stored on the system disk or stored in the host cache.

12 Claims, 8 Drawing Sheets

(56) References Cited

U.S. PATENT DOCUMENTS

| | | |
|---|---|---|
| 2014/0223096 A1 | 8/2014 | Zhe Yang et al. |
| 2015/0052616 A1* | 2/2015 | Hutchison ............... G06F 21/53 |
| | | 726/27 |
| 2015/0178110 A1 | 6/2015 | Li et al. |
| 2016/0055018 A1 | 2/2016 | Usgaonkar et al. |
| 2017/0308473 A1 | 10/2017 | Bassi |
| 2018/0121490 A1* | 5/2018 | Pendharkar ......... G06F 16/2365 |
| 2019/0266092 A1* | 8/2019 | Robinson ............ G06F 12/0808 |
| 2021/0064408 A1* | 3/2021 | Gill ........................ G06F 9/485 |
| 2021/0240509 A1* | 8/2021 | Brooker .............. G06F 9/45558 |

* cited by examiner

SECURE FAST REBOOT OF A VIRTUAL MACHINE

BACKGROUND

Shared virtual machine environments require resetting each virtual machine instance to their original master image between user computing sessions. This is done so that any changes made to the virtual machine by a user during a user session are not experienced by a subsequent user during a subsequent user session. As such, the operating system (OS) disk or volume for each virtual machine must be recreated between computing sessions. This recreation is implemented by either cloning a new OS disk from the master image or by replacing the virtual machine with a new virtual machine created from the master image.

SUMMARY

In at least one example, a computer system for managing a virtual machine is provided. The computer system includes a memory, a network interface; and at least one processor coupled to the memory and the network interface. The at least one processor is configured to initiate a computing session for accessing a virtual machine by accessing an operating system image from a system disk, manage the computing session by monitoring read and write requests generated during the computing session, write any requested information to at least one of a memory cache and a write back cache located separately from the system disk for right requests, read the operating system image content from at least one of the system disk and a host cache operably coupled between the system disk and the at least one processor for read requests for operating system image content, determine a completion of the computing session, and, upon completion of the computing session, clear the memory cache, clear the write back cache, and reboot the virtual machine using at least one of the operating system image on the system disk and the operating system image content stored in the host cache.

Implementations of the computer system can include one or more of the following features.

In the computer system, the at least one processor can be further configured to determine whether a read request is for session-specific data or system data. In some examples of the system, the at least one processor can be further configured to access at least one of the system disk and the host cache if the read request is for system data and access at least one of the memory cache and the write back cache if the read request is for session-specific data. In some additional examples of the computer system, the processor being configured to access at least one of the memory cache and the write back cache can include the at least one processor being configured to determine whether the session-specific data is located on the memory cache or the write back cache, access the memory cache and return the session-specific data if the at least one processor determines the session-specific data is on the memory cache, and access the write back cache and return the session-specific data if the at least one processor determines the session-specific data is on the write back cache.

In the computer system, the at least one processor can be further configured to determine whether a memory cache is within a threshold of being filled and, if the memory cache is within the threshold of being filled, copy the data stored on the memory cache to the write back cache.

In the computer system, the memory cache can be stored on the memory coupled to the at least one processor and the write back cache can be stored on a network memory coupled to the at least one processor via the network interface.

In the computer system, data stored on the system disk is unchanged during the computing session.

In another example, a method of managing a virtual machine is provided. The method includes initiating, by at least one processor, a computing session for accessing a virtual machine by accessing an operating system image from a system disk; managing, by the at least one processor, the computing session by monitoring read and write requests generated during the computing session; for write requests, writing, by the at least one processor, any requested information to at least one of a memory cache and a write back cache located separately from the system disk; for read requests for operating system image content, reading the operating system image content from at least one of the system disk and a host cache operably coupled between the system disk and the at least one processor; for read requests for operating system image content that is not stored in the host cache, storing the requested operating system image content in the host cache; determining, by the at least one processor, a completion of the computing session; and, upon completion of the computing session, clearing, by the at least one processor, the memory cache and the write back cache and rebooting, by the at least one processor, the virtual machine using at least one of the operating system image on the system disk and the operating system image content stored in the host cache.

Implementations of the method of managing a virtual machine can include one or more of the following features.

The method can further include determining, by the at least one processor, whether a read request is for session-specific data or system data.

In some examples, the method can further include accessing, by the at least one processor, at least one of the system disk and the host cache if the read request is for system data and accessing, by the at least one processor, at least one of the memory cache and the write back cache if the read request is for session-specific data.

In some examples of the method, accessing at least one of the memory cache and the write back cache can include determining, by the at least one processor, whether the session-specific data is located on the memory cache or the write back cache; accessing, by the at least one processor, the memory cache and returning the session-specific data if the at least one processor determines the session-specific data is on the memory cache; and accessing, by the at least one processor, the write back cache and returning the session-specific data if the at least one processor determines the session-specific data is on the write back cache.

The method can further include determining, by the at least one processor, whether a memory cache is within a threshold of being filled and, if the memory cache is within the threshold of being filled, copying, by the at least one processor, the data stored on the memory cache to the write back cache. In some examples, the memory cache can be stored on a memory locally operably coupled to the at least one processor and the write back cache can be stored on a network memory located remotely from the at least one processor and coupled to the at least one processor via a network interface.

In the method, data stored on the system disk is unchanged during the computing session.

In another example, a non-transitory computer readable medium storing computer executable instructions to manage a virtual machine is provided. The computer executable instructions include instructions to initiate a computing session for accessing a virtual machine by accessing an operating system image from a system disk operably coupled to at least one processor; manage the computing session by monitoring read and write requests generated during the computing session; for write requests, write any requested information to at least one of a memory cache and a write back cache located separately from the system disk; for read requests for operating system image content, reading the operating system image content from at least one of the system disk and a host cache operably coupled between the system disk and the at least one processor; for read requests for operating system image content that is not stored in the host cache, store the requested operating system image content in the host cache; determine a completion of the computing session; and upon completion of the computing session, clear the memory cache and the write back cache, and reboot the virtual machine using at least one of the operating system image on the system disk and the operating system image content stored in the host cache.

Implementations of the computer readable medium can include one or more of the following features.

In some examples of the computer readable medium, the instructions can further include instructions to determine whether a read request is for session-specific data or system data. In some additional examples, the instructions can further include instructions to access at least one of the system disk and the host cache if the read request is for system data and access at least one of the memory cache and the write back cache if the read request is for session-specific data.

In some additional examples, the instructions to access at least one of the memory cache and the write back cache if the read request is for session-specific data can include instructions to determine whether the session-specific data is located on the memory cache or the write back cache; access the memory cache and return the session-specific data if the at least one processor determines the session-specific data is on the memory cache; and access the write back cache and return the session-specific data if the at least one processor determines the session-specific data is on the write back cache.

In some examples of the computer readable medium, the instructions can further include instructions to determine whether a memory cache is within a threshold of being filled and, if the memory cache is within the threshold of being filled, copy the data stored on the memory cache to the write back cache. In some additional examples, the memory cache can be stored on a memory locally operably coupled to the at least one processor and the write back cache can be stored on a network memory located remotely from the at least one processor and coupled to the at least one processor via a network interface.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
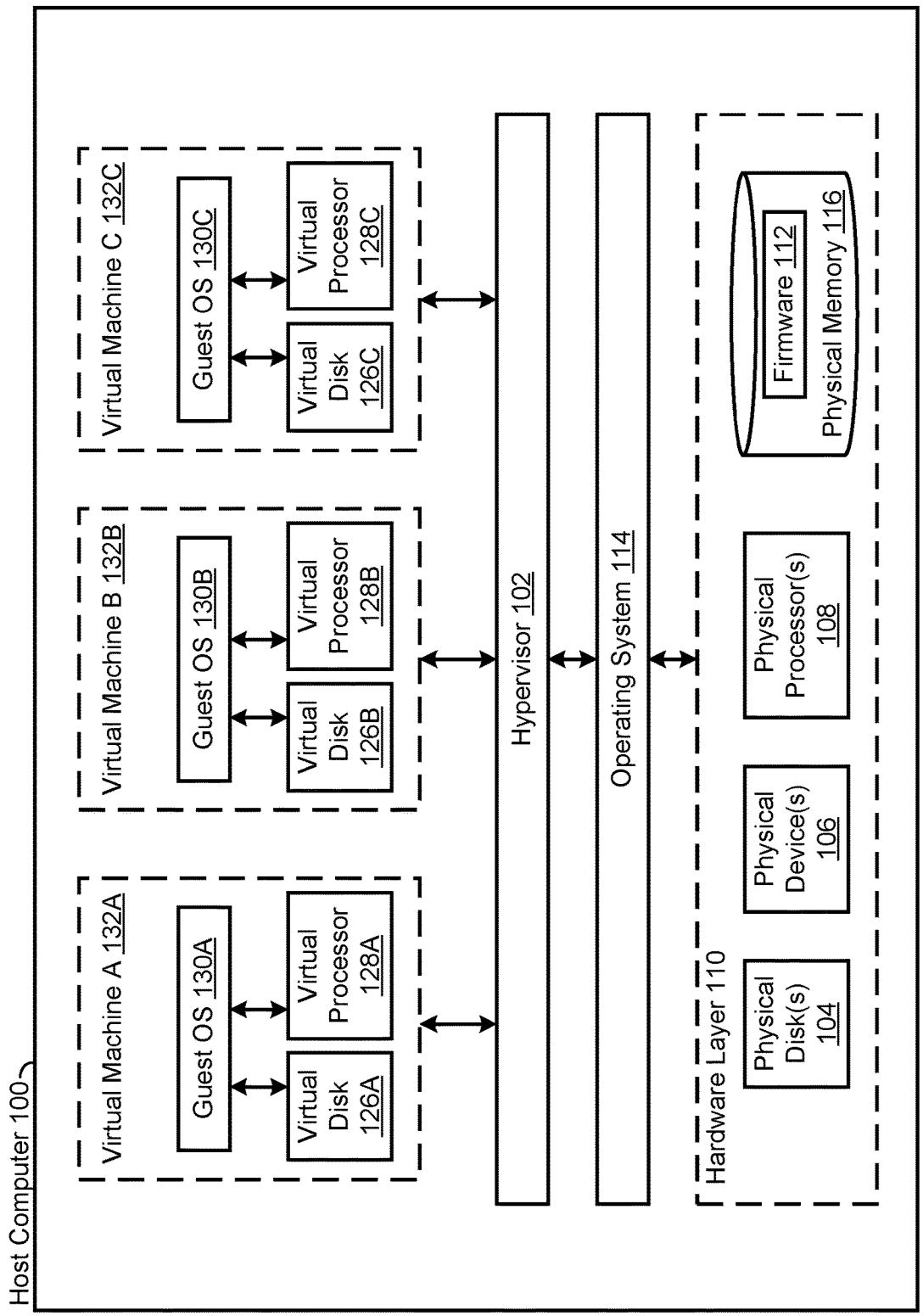
FIG. 1 is a block diagram of a host computer configured to host multiple virtual machines, in accordance with at least one example of the present disclosure.

As summarized above, various examples described herein are directed to systems for providing fast and secure virtual machine rebooting and methods and processes for use of such a system. These systems and methods overcome technical difficulties that arise in other virtual machine systems where, for example, a virtual machine must be reset between uses to provide a subsequent user with a clean or unaltered version of the virtual machine. Such a reset often requires launching a new virtual machine with a reset OS image. To initiate such a reset, a copy of the OS image must be retrieved from memory using, for example, the following process. The host computer can attempt to reach blocks of data from a copy of the OS image from storage cached locally by the hypervisor (e.g., the host cache). If the required blocks are not stored in the host cache (e.g., there is a cache miss), the blocks are retrieved from a network storage location containing a copy of the OS image represented by, for example, a virtual disk. The retrieved blocks are stored in the host cache and then returned to the host computer. If the required blocks are not stored in the virtual disk, the blocks are retrieved from a copy of the master image or disk, stored in the virtual disk storage, and then returned to the host computer. This process of populating blocks in the storage allocated to the virtual disk is referred to as disk hydration.

Block retrieval from the virtual disk is relatively slow when compared to retrieval from the host cache. Block retrieval from the master image to populate the virtual disk is even slower due to the typical remote location and slow performance of the master image storage. As such, the requirement to reset the host cache and to recreate the virtual disk (either by cycling the virtual machine and deleting and recreating the virtual disk or by deleting the virtual machine entirely and recreating the virtual machine) introduces latency in the overall virtual machine reboot process. The techniques as described herein provide increased functionality and reduced latency in a virtual machine environment by eliminating both the need to recreate an OS image for a virtual machine and the need to restart the virtual machine between user computing sessions.

To eliminate changes or writes to a system disk storing the OS image and, by extension, eliminate any potential changes or writes to the OS image, a software function such as a filter driver as described herein can monitor and control read and write access during a virtual machine session. The filter driver can be configured to intercept all read and write requests and redirect the requests. For example, for a write request, the filter driver can direct the write request to a memory cache or a write back cache defined separately from the system disk storing a copy of the OS image and to access information from the memory cache or write back cache as appropriate. For example, if a read request is for access to application information or other similar information, the filter driver can direct the read request to the system disk. If, however, the read request is for modified session-specific information, the filter driver can direct the read request to one or both of the memory cache and the write back cache as appropriate. Thus, by eliminating writing session-specific data to the system disk, any changes to the system disk storing a copy of the OS image are eliminated and, when rebooting the virtual machine, there is no need to clear the system disk and recreate an OS image for a virtual machine between computing sessions.

The techniques as described herein provide a secure and fast reboot of a virtual machine by re-using a system disk including an OS image that has previously been downloaded from a master image and hydrated to the system disk. Rather than rehydrating the system disk with a copy of the OS image each time a virtual machine is reset or rebooted, the techniques as described herein maintain an unaltered copy of the OS image that can be used to quickly and efficiently reboot a virtual machine as compared to rehydrating a copy of the OS image from a master image as is done in traditional virtual machine systems, in some situations.

Thus, and in accordance with at least some examples disclosed herein, systems, methods, and processes are provided for virtual machine management that provide a fast and secure reboot of a previously accessed virtual machine when the virtual machine is, for example, returned to a virtual machine pool. These systems, methods, and processes increase the overall efficiency of virtual machine systems especially where there is high user turnover or relatively short computing session times.

In some examples, a processor associated with a server included in, for example, a virtual machine management system, can be configured to initiate a user computing session for accessing a virtual machine by accessing an OS image from a system disk and manage the computing session by monitoring all read and write requests submitted by a user or a user session application during the computing session. For all write requests, the processor can write any requested information to at least one of a memory cache and a write back cache located separately from the system disk. For all read requests for OS image content, the processor can read the OS image content from at least one of the system disk and an optional host cache that is operably coupled between the system disk and at least one processor. For all read requests for OS image content that is not currently stored in the host cache, the processor can store the OS image content in the host cache. As the computing session progresses, the processor can determine a completion of the computing session and, upon completion of the computing session, clear the memory cache and the write back cache, and reboot the virtual machine using the at least one of OS image on the system disk and OS image content stored in the host cache. By using such a process, any write request is isolated from the system disk and, as such, the system disk storing the OS image remains unaltered and can be used during the reboot process rather than clearing the system disk and rehydrating the system disk with a new copy of the OS image.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Host Computer and Virtual Machine System

FIG. 1 shows a host computer 100 configured to, for example, host a pool of virtual machines in a distributed workspace environment. The computer 100 can include one or more physical disks 104, one or more physical devices 106, one or more physical processors 108 and a physical memory 116. In some examples, firmware 112 can be stored on the physical memory 116 and can be executed by one or more of the physical processors 108. The computer 100 can further include an operating system 114 that can be executed by one or more of the physical processors 108. Still further, the computer 100 can include a hypervisor 102 that can be executed by one or more of the physical processors 108. The computer can also include one or more virtual machines 132A-132C (generically referred to as virtual machine 132) that are each configured to be implemented using one or more of the physical processors 108. In some examples, each virtual machine 132 can be assigned or otherwise can include a virtual disk 126A-C and a virtual processor 128A-C. In some embodiments, a first virtual machine 132A can execute a guest operating system 130A on a virtual processor 128A. Similarly, a second virtual machine 132B can execute a guest operating system 130B on a virtual processor 128B and a third virtual machine 132C can execute a guest operating system 130C on a virtual processor 128C.

Referring again to FIG. 1, the computer 100 can include a hardware layer 110 that includes one or more pieces of hardware that communicates with the host computer. In some embodiments, the hardware layer 110 can include any hardware included in the computer 100. For example, as shown in FIG. 1, the hardware layer 110 can include one or more physical disks 104, one or more physical devices 106, one or more physical processors 108 and memory 116. However, it should be noted that the components shown in the hardware layer 110 are provided by way of example only. Depending upon the physical architecture of the computer 100, the components contained within the hardware layer 110 can vary accordingly.

In the hardware layer 110, the physical disk 104 can be implemented as one or more hard drives configured to be accessed by one or more components of the computer 100. In some examples, the physical devices 106 can be any combination of internal devices included in the computer 100 and external devices that communicate with the computer. For example, the physical device 106 can include one or more of a network interface card, a video card, a keyboard, a mouse, an input device, a monitor, a display device, speakers, an optical drive, a storage device, a universal serial bus connection, and other similar physical computing devices. The processor 108, in some examples, can be any processor configured to load and execute one or more instructions. In some examples, the processor 108 can include one or more processing cores. In some embodiments, the processor 108 can include one or more different types of processors such as a central processing unit, a graphics processing unit, a physics processing unit, and other similar processor types. In some examples, the physical memory 116 can include any type of memory configured to store one or more executable instructions to be executed by the one or more processors 108 as described herein.

As shown in FIG. 1, the firmware 112 can include any combination of executable instructions and hardware that controls hardware communicating with or included within the computer 100. In some embodiments, the firmware 112 can control one or more pieces of hardware within the hardware layer 110. For example, the firmware 112 can be executed by one or more processors 108 during operation of the computer 100. In some examples, the firmware 112 can be boot firmware such as the basic input/output system (BIOS.) Additional firmware 112 executing on the computer 100 can interface with the BIOS.

In one embodiment, the computer 100 can include an operating system 114 executed by one or more physical processors 108. In some embodiments, the operating system 114 can access the hardware devices in the hardware layer 110. The operating system 114 can be any operating system, such as a version of Linux, MICROSOFT WINDOWS, ORACLE SOLARIS, or other operating system. FIG. 1 illustrates an example arrangement where the hypervisor 102 executes within the context of the operating system 114 executing on the computer 100. In this embodiment, the operating system 114 can be referred to as a host operating system 114, while the other operating systems can be referred to as guest operating systems. Guest operating systems can include the guest operating systems 130A-C executing on the virtual machines 132.

As further shown in FIG. 1, the computer 100 includes a hypervisor 102. The hypervisor 102, in some examples, can be a program that is executed by the processors 108 on the computer 100 to manage any number of virtual machines as organized into a virtual machine pool. The hypervisor 102 can be referred to as a virtual machine monitor, or platform virtualization software. In some examples, the hypervisor 102 can be any combination of executable instructions and hardware that monitors virtual machines executing on a computing machine.

As shown in FIG. 1, the computer 100 as described includes a Type 2 hypervisor 102, or a hypervisor that executes within an operating system 114 executing on the host computer. A Type 2 hypervisor, in some examples, can execute within an operating system environment and the virtual machines can execute at an application level above the hypervisor. In some examples, a Type 2 hypervisor executes within the context of an operating system such that the Type 2 hypervisor interacts with the operating system. However, it should be noted that a Type 2 hypervisor is shown by way of example only. In some implementations, a Type 1 hypervisor can be used where a Type 1 hypervisor is implemented as software interacting directly with the physical components of the host computer.

The hypervisor 102 can be configured to provide virtual resources to operating systems 130 or control execution of virtual machines 132 in any manner that simulates the operating systems 130 having access to system resources. System resources can include, for example, one or more of physical devices, physical disks, physical processors, physical memory, and other similar components included in, for example, the hardware layer 110. In some implementations, the hypervisor 102 can be used to emulate virtual hardware, partition physical hardware, virtualize physical hardware, or execute virtual machines that provide access to computing environments. In other examples, the hypervisor 102 can be configured to control processor scheduling and memory partitioning for a virtual machine 132 executing on the computer 100. An example of such a computer 100 can include a server configured to run the XEN SERVER software as provided by Citrix Systems, Inc., of Fort Lauderdale, Fla.

In one embodiment, the hypervisor 102 can create a virtual machine 132 in which an operating system 130 executes. In one of these embodiments, for example, the hypervisor 102 loads a virtual machine image such as the OS image as described herein to create a virtual machine 132.

In one embodiment, the hypervisor 102 controls the execution of at least one virtual machine 132. In another embodiment, the hypervisor 102 presents at least one virtual machine 132 with an abstraction of at least one hardware resource provided by the computer 100. The abstraction can further be referred to as a virtualization or virtual view of the hardware, memory processor, and other system resources available on the computer 100. Hardware or hardware resources, in some examples, can be any hardware resource available within the hardware layer 110. In other embodiments, the hypervisor 102 can be configured to control the manner in which virtual machines 132 access the physical processors 108 available in the computer 100. Controlling access to the physical processors 108 can include determining whether a virtual machine 132 should have access to a processor 108 and how physical processor capabilities are presented to the virtual machine 132.

As shown in FIG. 1, computer 100 is illustrated as hosting three virtual machines 132. It should be noted that his is shown by way of example only, and the computer 100 can be configured to host any number of virtual machines 132 organized into, for example, a virtual machine pool. The hypervisor 102, in some examples, provides each virtual machine 132 with a unique virtual view of the physical hardware, memory, processor and other system resources available to that virtual machine. In some embodiments, the unique virtual view can be based on one or more of virtual machine permissions, application of a policy engine to one or more virtual machine identifiers, the user accessing a virtual machine, the applications executing on a virtual machine, networks accessed by a virtual machine, or any other similar criteria. In some implementations, the hypervisor 102 can provide each virtual machine 132 with a substantially similar virtual view of the physical hardware, memory, processor and other system resources available to the virtual machines 132.

As further shown in FIG. 1, and noted above, each virtual machine 132 can include a virtual disk 126 and a virtual processor 128. The virtual disk 126 can include a virtualized view of one or more physical disks 104 of the computer 100, or a portion of one or more physical disks. The virtualized view of the physical disks 104 can be generated, provided, and managed by the hypervisor 102. In some examples, the hypervisor 102 can provide each virtual machine 132 with a unique view of the physical disks 104. Thus, in these embodiments, the virtual disk 126 included in each virtual machine 132 can be unique when compared with the other virtual disks 126.

Similarly, a virtual processor 128 can be a virtualized view of one or more physical processors 108 of the computer 100. In some embodiments, the virtualized view of the physical processors 108 can be generated, provided, and managed by the hypervisor 102. In some embodiments, the virtual processor 128 has substantially all of the same characteristics of at least one physical processor 108. In other embodiments, the virtual processor 128 provides a modified version of the physical processors 108 such that at least some of the capabilities and resources of the virtual processor are different than the characteristics of the corresponding physical processor.

In some implementations, the hypervisor 102 can execute a guest operating system 130 within each virtual machine 132 created and managed by the hypervisor. For example, the guest operating system 130 can provide a user of the virtual machine 132 with access to resources within a computing environment. In some examples, a resource includes a program, an application, a document, a file, an executable program file, a desktop environment, a computing environment, or other similar resource made available to a user of the virtual machine 132.

Figure 2:
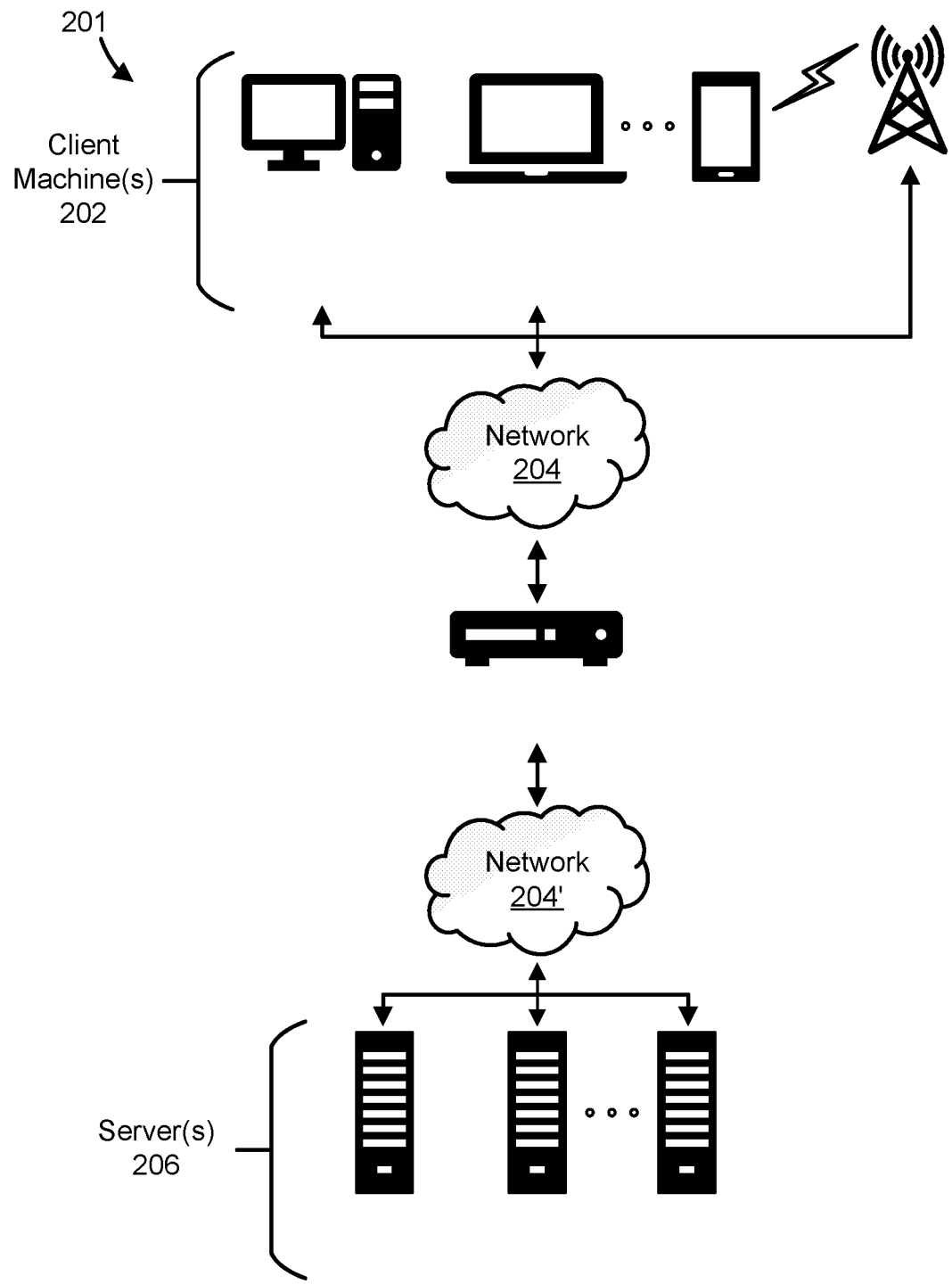
FIG. 2 is a block diagram of a network environment of computing devices in which various aspects of the present disclosure can be implemented.

Referring now to FIG. 2, a non-limiting network environment 201 in which various aspects of the disclosure can be implemented includes one or more client machines 202A-202N, one or more remote machines 206A-206N, one or more networks 204, 204', and one or more appliances 208 installed within the computing environment 201. The client machines 202A-202N communicate with the remote machines 206A-206N via the networks 204, 204'. The computing environment 201 can also be referred to as a distributed computer system.

In some examples, the client machines 202A-202N communicate with the remote machines 206A-206N via an intermediary appliance 208. The illustrated appliance 208 is positioned between the networks 204, 204' and may also be referred to as a network interface or gateway. In some examples, the appliance 208 can operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some examples, multiple appliances 208 can be used, and the appliance(s) 208 can be deployed as part of the network 204 and/or 204'.

The client machines 202A-202N may be generally referred to as client machines 202, local machines 202, clients 202, client nodes 202, client computers 202, client devices 202, computing devices 202, endpoints 202, or endpoint nodes 202. The remote machines 206A-206N may be generally referred to as servers 206 or a server farm 206. In some examples, a client device 202 can have the capacity to function as both a client node seeking access to resources provided by a server 206 and as a server 206 providing access to hosted resources for other client devices 202A-202N. The networks 204, 204' may be generally referred to as a network 204. The networks 204 can be configured in any combination of wired and wireless networks.

A server 206 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 206 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 206 can execute a remote presentation services program or other program that uses a thin client or a remote-display protocol to capture display output generated by an application executing on a server 206 and transmit the application display output to a client device 202.

In yet other examples, a server 206 can execute a virtual machine providing, to a user of a client device 202, access to a computing environment. The client device 202 can be a virtual machine. The virtual machine can be managed by, for example, a hypervisor, a virtual machine manager (VMM), or any other hardware virtualization technique within the server 206. For example, a server 206 can be implemented to function as host computer 100 as shown in FIG. 1 and described above.

In some examples, the network 204 can be: a local area network (LAN); a metropolitan area network (MAN); a wide area network (WAN); a primary public network 204; and a primary private network 204. Additional examples can include a network 204 of mobile telephone networks that use various protocols to communicate among mobile devices. For short range communications within a wireless local-area network (WLAN), the protocols can include 802.11, Bluetooth, and Near Field Communication (NFC).

Figure 3:
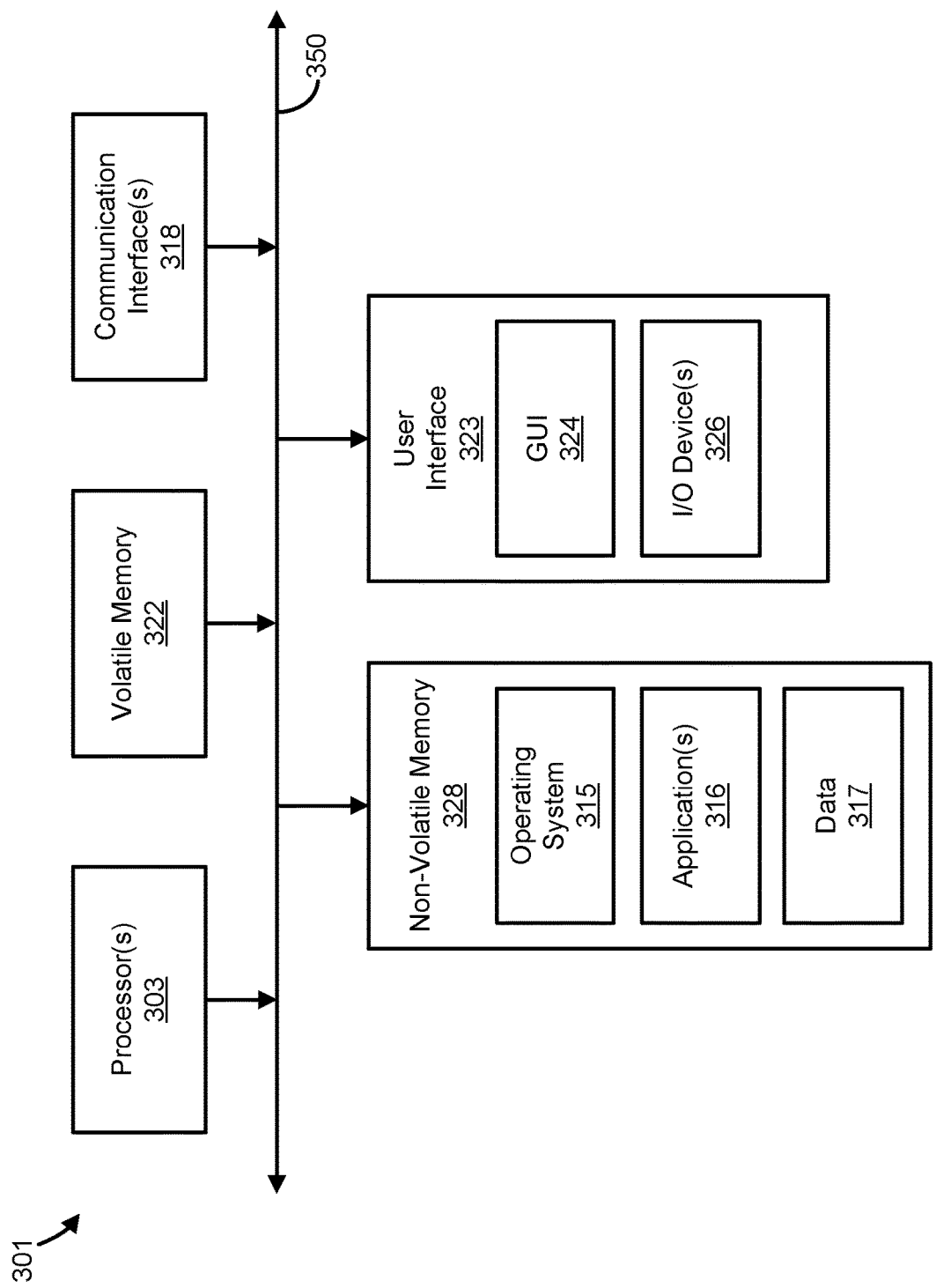
FIG. 3 is a block diagram of a computing device that can implement one or more of the computing devices of FIG. 2, in accordance with at least one example of the present disclosure.

FIG. 3 depicts a block diagram of a computing device 301 useful for practicing an example of client devices 202, appliances 208 and/or servers 206. The computing device 301 includes one or more processors 303, volatile memory 322 (e.g., random access memory (RAM)), non-volatile memory 328, user interface (UI) 323, one or more communications interfaces 318, and a communications bus 350. One or more of the computing devices 301 may also be referred to as a computer system.

The non-volatile memory 328 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 323 can include a graphical user interface (GUI) 324 (e.g., a touchscreen, a display, etc.) and one or more input/output (I/O) devices 326 (e.g., a mouse, a keyboard, a microphone, one or more speakers, one or more cameras, one or more biometric scanners, one or more environmental sensors, and one or more accelerometers, etc.).

The non-volatile memory 328 stores an operating system 315, one or more applications 316, and data 317 such that, for example, computer instructions of the operating system 315 and/or the applications 316 are executed by processor(s) 303 out of the volatile memory 322. In some examples, the volatile memory 322 can include one or more types of RAM and/or a cache memory that can offer a faster response time than a main memory. Data can be entered using an input device of the GUI 324 or received from the I/O device(s) 326. Various elements of the computing device 301 can communicate via the communications bus 350.

The illustrated computing device 301 is shown merely as an example client device or server and can be implemented by any computing or processing environment with any type of machine or set of machines that can have suitable hardware and/or software capable of operating as described herein.

The processor(s) 303 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 303 can be analog, digital or mixed. In some examples, the processor 303 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 318 can include one or more interfaces to enable the computing device 301 to access a computer network such as a Local Area Network (LAN), a Wide Area Network (WAN), a Personal Area Network (PAN), or the Internet through a variety of wired and/or wireless connections, including cellular connections.

In described examples, the computing device 301 can execute an application on behalf of a user of a client device. For example, the computing device 301 can execute one or more virtual machines managed by a hypervisor as described herein. Each virtual machine can provide an execution session within which applications execute on behalf of a user or a client device, such as a hosted desktop session. The computing device 301 can also execute a terminal services session to provide a hosted desktop environment. The computing device 301 can provide access to a remote computing environment including one or more applications, one or more desktop applications, and one or more desktop sessions in which one or more applications can execute.

Secure and Fast Reboot of a Virtual Machine

As noted above, to improve or to provide improved performance and efficiency of a virtual machine environment, a secure and fast rebooting process can be implemented. As described below, in order to achieve a secure and fast reboot, changes to the system disk including a copy of the OS image during a user computing session are eliminated, thereby removing a need to clear the system disk and rehydrate the OS image between computing sessions. Rather, all user session changes are written to a local memory cache and/or a write back cache that can be quickly reset during rebooting of a virtual machine without making any changes to the system disk including the copy of the OS image.

Figure 4:
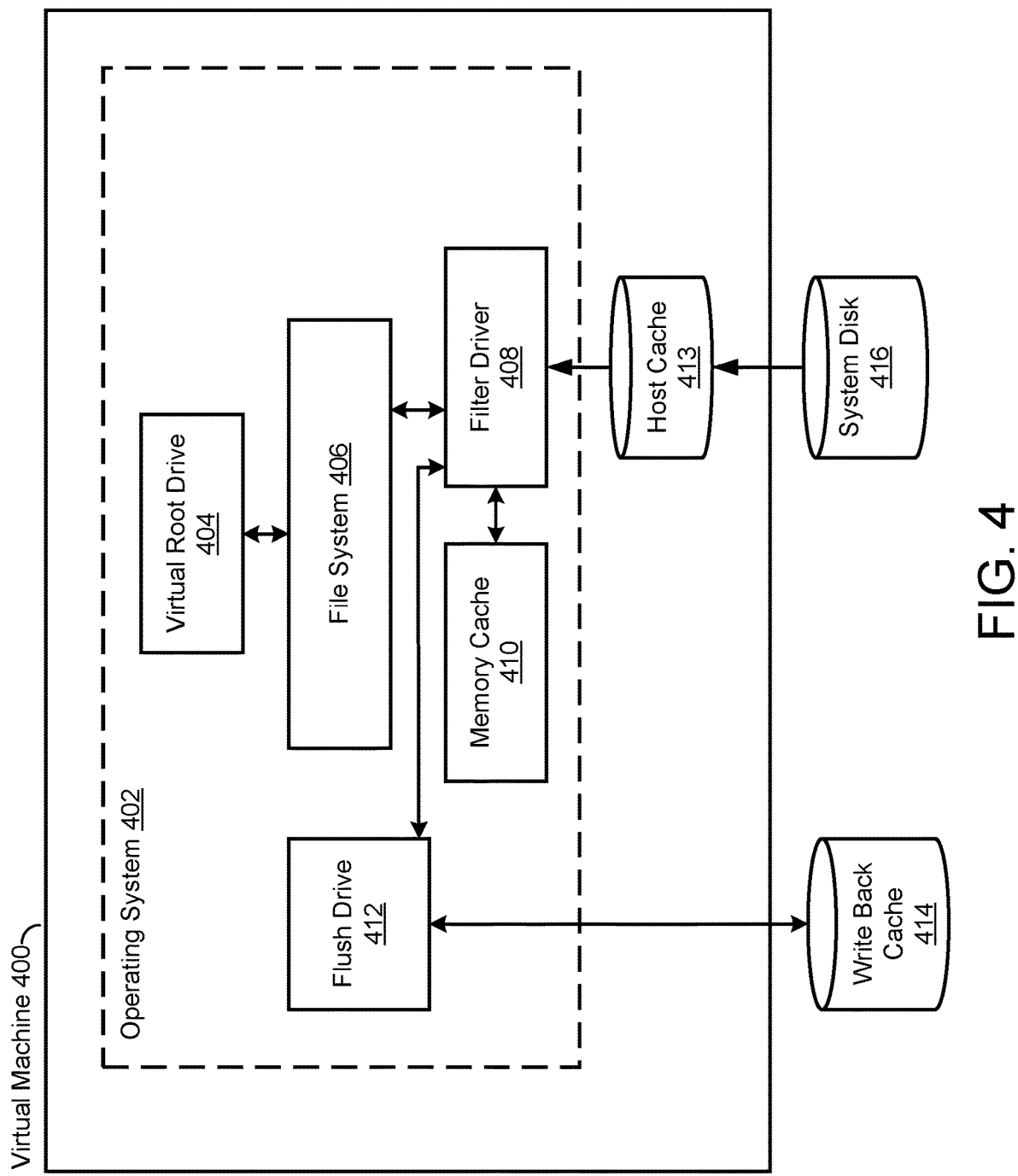
FIG. 4 is a block diagram of a virtual machine including a filter driver, in accordance with at least one example of the present disclosure.

FIG. 4 illustrates a sample block diagram of an updated virtual machine 400 as described herein. The virtual machine 400 can include a guest operating system 402. The operating system 402 can provide access to a virtual root drive 404 that includes, for example, virtual storage space for use by a user of the virtual machine 400. For example, the virtual root drive 404 can have a logical and physical structure navigable to store and access files and applications as implemented by the operating system 402 during operation of the virtual machine 400. The virtual root drive 404 can be used to access an underlying file system 406 implemented by the guest operating system 402. The file system 406 can be configured to execute various functions related to file access such as handling read and write requests.

As shown in FIG. 4, the virtual machine 400 can further include a filter driver 408. The filter driver 408 can be implemented as a software process that is configured to monitor and intercept calls to the file system 406 that are generated by manipulation of the virtual root drive 404. The filter driver 408 can be further configured to redirect any write and read requests as described herein to initially direct write requests to a local memory cache 410. In certain implementations, the local memory cache 410 can include local area memory allocated by, for example, a hypervisor for use by the virtual machine 400. As described herein, by using the filter driver 408 to redirect write requests, changes to a system disk including a copy of the OS image as described above can be eliminated, thereby eliminating the need to clear the system disk and recreate a copy of the OS image between computing sessions. Such a process is described in greater detail in the discussion of FIG. 5A below.

As further shown in FIG. 4, the virtual machine 400 can include a flush drive 412. In some implementations, the flush drive can be mapped to a write back cache 414. In some examples, the filter driver 408 can be configured to push data from the local memory cache 410 to the flush drive 412. The data on the flush drive 412 can be pushed for writing to the write back cache 414. Such an arrangement can take advantage of the higher speed local memory (e.g., flush drive 412) while reading from and writing to the write back cache 414 which may be located, for example, on a network storage device. In some examples, the filter driver 408 can also be configured to operate with a system disk 416. As further shown in FIG. 4, the filter driver 408 can be configured to operate with an allocated portion of a host cache 413 that is positioned between the filter driver and the system disk 416. Any read requests for the system disk 416 can be stored in the allocated portion of the host cache 413, thereby providing a local storage for system disk information such as OS image data.

It should be noted that, as shown in FIG. 4, the host cache 413 is shown as positioned between the filter driver 408 and the system disk 416 by way of example only. In some implementations, a portion of the host cache 413 can be further allocated as a read/write cache positioned between the flush drive 412 and the write back cache 414. In such an example, the data stored on the flush drive 412 can be pushed to the allocated portion of the host cache 413 for writing to the write back cache 414.

In certain implementations, during boot process of virtual machine 400, the filter driver 408 can be loaded and implemented early in the process. For example, the filter driver 408 can be loaded prior to the file system 406. As a result, the filter driver 408 can monitor all communication between the file system 406 and any external storage, thereby ensuring that no application or user data being accessed in the virtual machine 400 will make any changes to the system disk 416 containing the OS image. During a reboot of the virtual machine 400, the memory cache 410, the flush drive 412, and the write back cache 414 can be reset, thereby removing any data from a previous user session. However, the data contained in the allocated portion of the host cache 413 and the system disk 416 is maintained, thereby providing for a quicker reboot process as the OS image can be loaded from the host cache 413 or, if necessary, from the system disk 416. However, rehydration of the OS image to the system disk is eliminated as described herein.

Figure 5A:
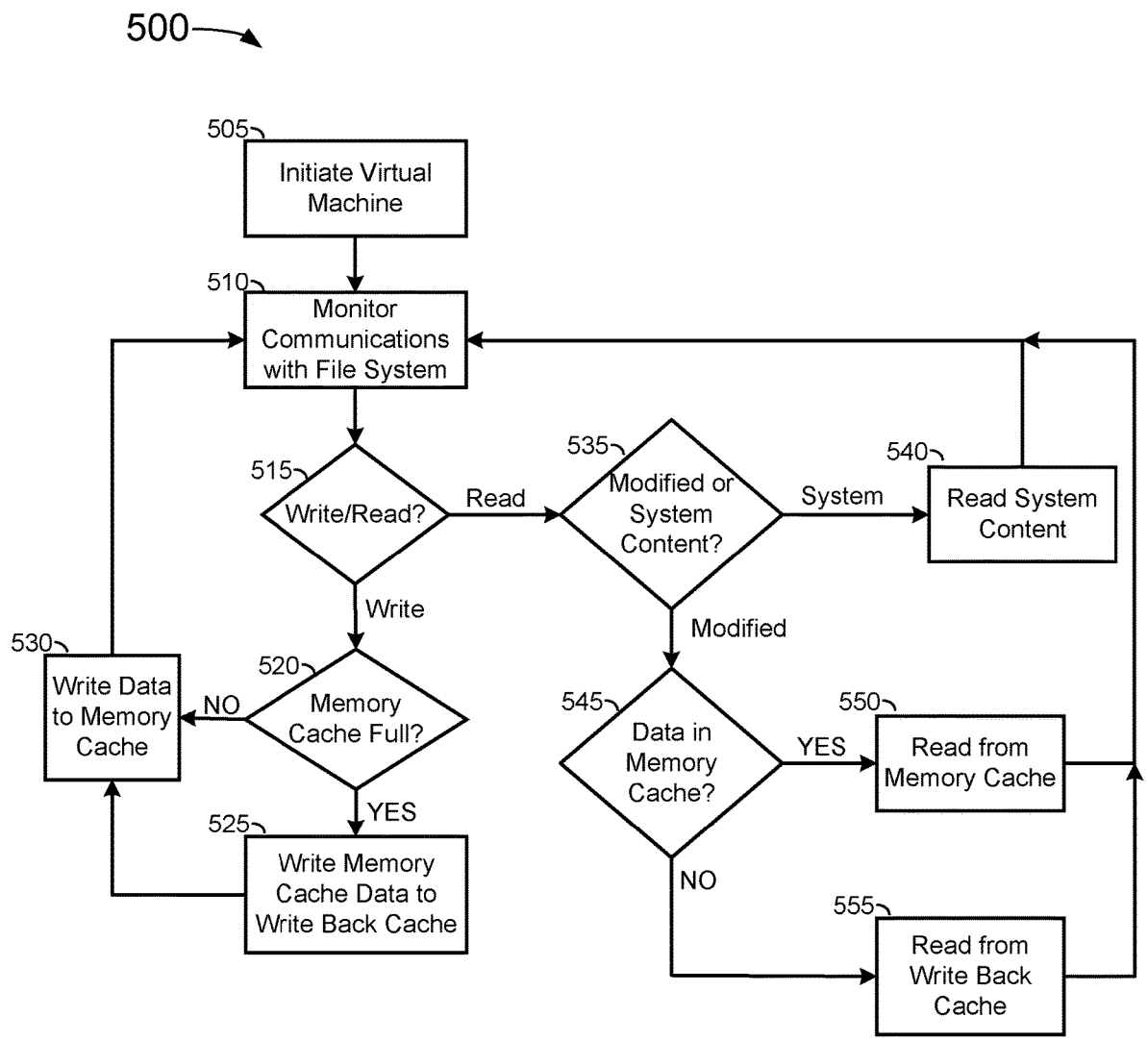
FIG. 5A is a flow diagram illustrating a process for operating a virtual machine as implemented by a filter driver, in accordance with at least one example of the present disclosure.

FIG. 5A illustrates a sample process 500 for initiating an instance of a virtual machine and monitoring input and output activity of the virtual machine by a filter driver such as filter driver 408 as described above. For example, as shown in FIG. 5A, the process 500 can include initializing 505 a virtual machine. As described herein, initializing a virtual machine can include resetting the memory cache 410, the flush drive 412, and the write back cache 414 as well as assigning an instance of a virtual machine in a virtual machine pool to a specific user.

Process 500 can further include monitoring 510 communication between a user session (e.g., communications initiated by the user and/or communications initiated by an application running during the user session) and a virtual machine file system such as file system 406 as described above. In certain implementations, the filter driver as can be configured to monitor 510 the communications. If the filter driver determines that there is communication between the user session and the file system, the filter driver can further determine 515 if the communication is a write or read request. If the filter driver determines 515 that the communication is a write request, the filter driver can determine 520 whether the memory cache is at or near capacity. For example, when allocated, the memory cache can include a set amount of storage space such as 50 MB or 100 MB. Once the memory cache is above a certain percentage full, for example, above 90%, the filter driver can determine 520 that the memory cache is full. If the filter driver does determine 520 that the memory cache is full, the filter driver can write 525 the data stored in the memory cache to the write back cache. For example, the filter driver can push the data stored in memory cache 410 as shown in FIG. 4 to the flush drive 412, which is pushed by the flush drive and written to the write back cache 414 as described above. The filter driver can then write 530 the new data to the memory cache and continue to monitor 510 communication between the user session and the file system. Conversely, if the filter driver determines 520 that the memory cache is not at or near capacity, the filter driver can write 530 the new data to the memory cache and continue to monitor 510 communication between the user session and the file system.

If the filter driver determines 515 that communications between the user session and the file system include a read request, the filter driver can further determine 535 if the read request is for data that is stored in session-specific modified data (e.g., data stored in the memory cache or the write back cache from write requests occurring during the current computing session) or if the requested data is in the system disk. In some examples, the filter driver can be configured to track all write requests during a computing session. Each of those write requests during the computing session can be associated with session-specific data. In such an example, if a read request is for information that was not generated by a computing session write request, the filter driver can determine that the request is for information stored on the system disk. If the filter driver determines 535 that the requested data is stored on the system disk, the filter driver can read 540 the requested system data and provide the requested data to the requestor (e.g., the user or an application associated with the user session). In some examples, read operations from the system disk may leverage the allocated portion of the host cache 413 as described above. The filter driver can then continue to monitor 510 communications between the user session and the file system for additional read and write requests.

Figure 5B:
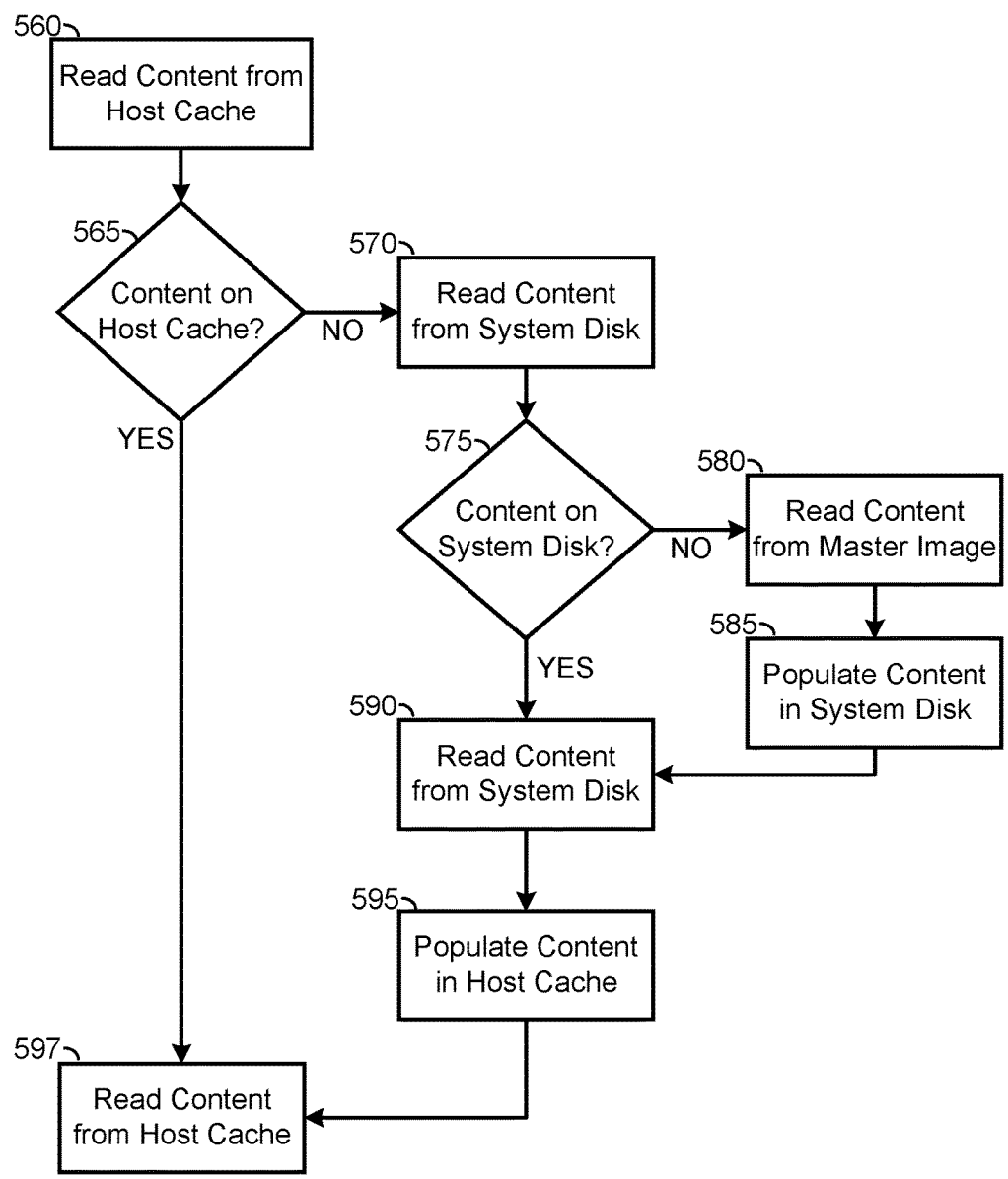
FIG. 5B is a flow diagram illustrating a process for determining whether a local cache or a system disk includes a copy of a master image for operating a virtual machine, in accordance with at least one example of the present disclosure.

Depending upon when the request for system data or content is received, the system data can be stored in various locations. For example, when a virtual machine is initially booted, the host cache (e.g., the allocated portion of the host cache 413 as described above) can include only a portion of the OS image content as stored on the system disk (e.g., system disk 416). In such an example, a read request for a portion of the OS image that is not included on the host cache will fail and the content will be read from the system disk. However, the content read from the system disk can also be stored on the host cache such that, when a subsequent read request includes a request for the same OS image content, the requested content can be read directly from the host cache. An example read process 540 is shown in FIG. 5B. When a virtual machine is first started, the host cache will be empty. Reboots performed without resetting or power cycling the virtual machine can leverage those portions of the OS image content stored on the host cache from the previous boots.

As shown in FIG. 5B, the read process 540 can include the filter driver reading the requested content from the host storage controller. The host can 560 read the content from the host cache (e.g., the allocated portion of the host cache 413 as described above). The host can determine 565 if the content is contained on the host cache. If the host determines 565 that the content is not on the host cache, the host can read 570 the content from the system disk (e.g., system disk 416). The system disk can then determine 575 if the content is stored on system disk's storage. If the system disk determines 575 that the content is not on the system disk's storage, the system disk can read 580 the content from the master OS image and populate 585 the content to the system disk's storage. After populating 585 the content to the system disk's storage, or if the system disk determines 575 that the requested content is on the system disk's storage, the system disk can read 590 the content from the system disk's storage and return the data to the host. The host can then populate 595 the content to the host cache. After populating 595 the content to the host cache, or if the host determines 565 that the content was stored on the host cache, the host can return 597 the content from the host cache to the filter driver.

Referring back to FIG. 5A, if the filter driver determines 535 that the requested data is session-specific modified data, the filter driver can further determine 545 if the requested data is stored in the memory cache or the write back cache. In some examples, the filter driver can be configured to perform a read request on the memory cache first. If that read request fails, the filter driver can then perform a read request on the write back cache to determine if the requested data is stored there. If the filter driver determines 545 that the requested data is stored in the memory cache, the filter driver can read 550 the requested data from the memory cache and provide the requested data to the requestor. Conversely, if the filter driver determines that the requested data is not in the memory cache, the filter driver can read 555 the requested data from the write back cache and provide the requested data to the requestor. Upon delivery of the session-specific modified data, the filter driver can continue to monitor 510 user communications with the file system until the user ends their virtual machine user session. As noted above, in certain implementations, when reading and writing data to and from the writeback cache, the host may in instances use an additional allocated portion of the host cache 413 to improve performance. In such cases, if the data requested in a read operation is present in the read/write cache, the data from the additionally allocated portion of the host cache will be returned to the filter driver.

Figure 6:
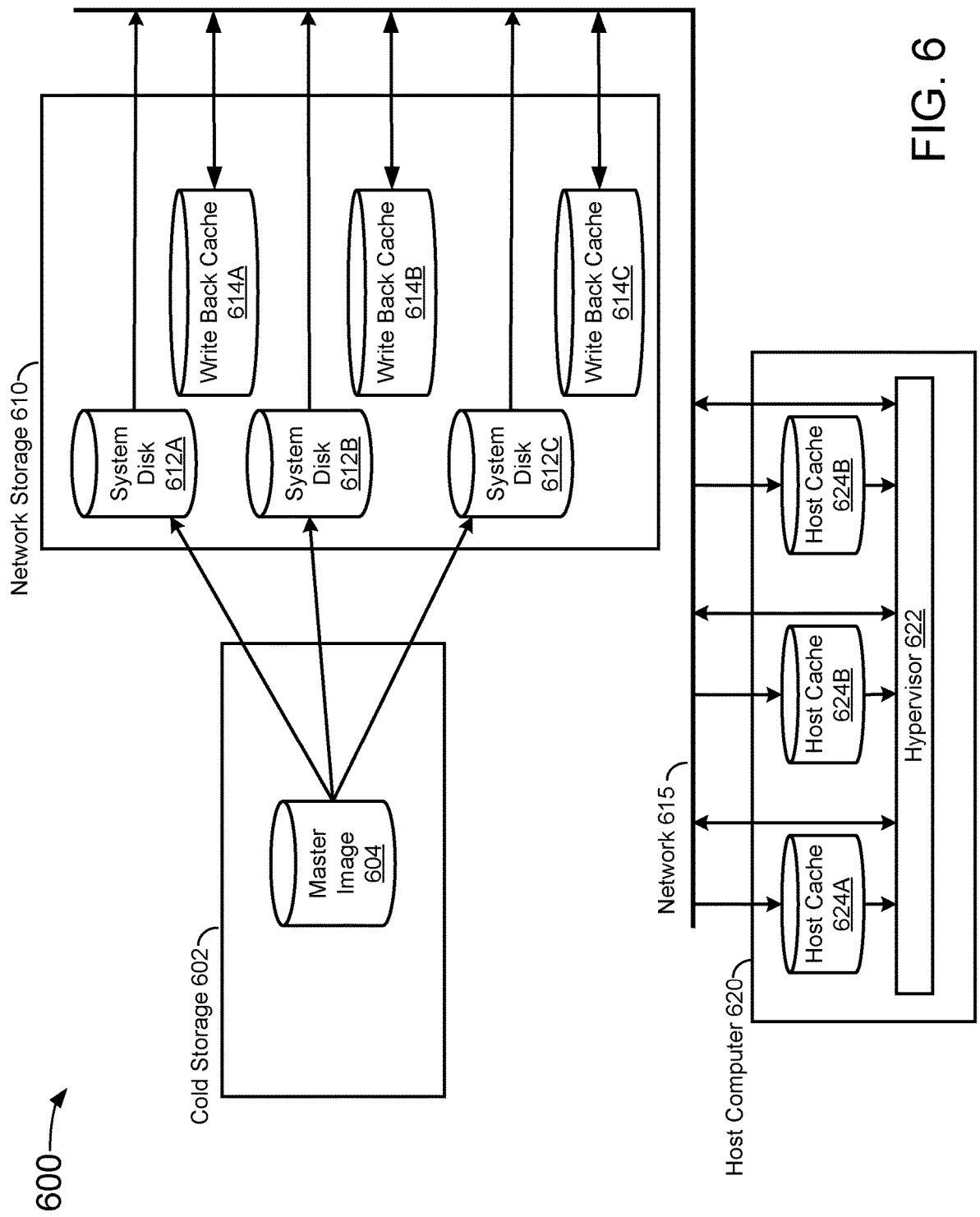
FIG. 6 is a block diagram of an updated network architecture implementing updated caching, in accordance with at least one example of the present disclosure.

FIG. 6 illustrates a sample updated network architecture 600 for use with the virtual machine system as described herein. As shown in FIG. 6, the system 600 can include a cold storage 602. For example, the storage 600 can be configured to store a copy of the master image 604 of an OS image for a virtual machine system.

In some implementations, the storage 602 is located in a secure network environment such that access to files stored therein can be closely monitored. For example, the storage 602 can be implemented as a network storage device housed and maintained by a virtual machine system provider.

As further shown in FIG. 6, a network storage 610 can be operably connected to the cold storage 602. Upon initialization of a virtual machine system, one or more system disks of the network storage 610 can be populated with a copy of the master image 604 during the hydration process. As such, each of system disks 612A, 612B, and 612C can include a virtual machine OS image copied or cloned from the master image 604. In some implementations, the system disks 612A, 612B, and 612C can function similar to system disk 416 as shown in FIG. 4 and described above.

Additionally, network storage 610 can include one or more write back caches 614A, 614B, and 614C. For example, the write back caches 614A, 614B, and 614C can function similar to the writeback cache 414 as shown in FIG. 4 and described above. For example, the write back caches 614A, 614B, and 614C can be configured to store session-specific information for a particular user computing session of a virtual machine as described herein. In some examples, as shown in FIG. 6, each system disk can have an associated write back cache. However, this is shown by way of example only. In some implementations, multiple system disks can share a write back cache that is partitioned or otherwise structured to provide multiple virtual machines (launched, for example, based upon OS images stored on separate system disks) storage access.

As further shown in FIG. 6, a host computer 620 can be operably connected to the network storage 610 via, for example a wired or wireless network connection 615. The computer 620 can include a hypervisor 622. In some examples, the hypervisor 622 can function similar to the hypervisor 102 as shown in FIG. 1 and described above.

The computer 620 can also include one or more host caches 624A, 624B, and 624C. In some implementations, the host caches 624A, 624B, and 624C can be configured to function as the allocated portion of the host cache 413 as shown in FIG. 4 and described above. In such an example, the host caches 624A, 624B, and 624C can be configured to store session-specific information for individual virtual machine computing sessions as well as to store master image content as loaded from, for example, one of system disks 612A, 612B, and 612C. In some implementations, the host caches may be implemented using volatile memory, fast local persistent storage, or a combination of both.

In a specific implementation example, a user device such one of client machines 202 can request a virtual machine computing session. The hypervisor 622 can receive the request and initiate the virtual machine computing session including assigning a host cache such as host cache 624A to the virtual machine. The hypervisor can configure a portion of the host cache to act as the allocated portion of the host cache 413 as shown in FIG. 4 and described above. The hypervisor can determine if a copy of the required blocks from the OS image are stored on the host cache 624A and, if the blocks are stored thereon, load the blocks from the host cache. If the hypervisor 622 determines that a copy of the required OS image blocks are not stored on the host cache 624A, the hypervisor can access the OS image data from a system disk (e.g., system disk 612A) and initiate the computing session. The hypervisor 622 can also designate a write back cache (e.g., write back cache 614A) for information storage during the computing session. As noted above, a filter driver, such as filter driver 408, associated with each virtual machine can create a local memory cache. The filter driver can then monitor write requests to the local memory cache to determine if the local memory has reached a capacity threshold. Upon reaching the capacity threshold, the filter driver can copy the information from the local memory to the write back cache 614A. As the filter driver as described above intercepts and directs all write requests to the write back cache 614A, the system disk 612A is not being written to, thereby preventing alteration of the OS image stored on the system disk.

It should be noted that the capacity threshold for the local cache written to by the filter driver (e.g., the memory cache 410 as shown in FIG. 4) can be configured or varied based upon the available resources used by the virtual machine. For example, as noted above, the threshold capacity can be set at 90%. In some examples, the threshold capacity can be set at 75%, 80%, 85%, 95%, and other similar threshold capacity percentages.

Figure 7:
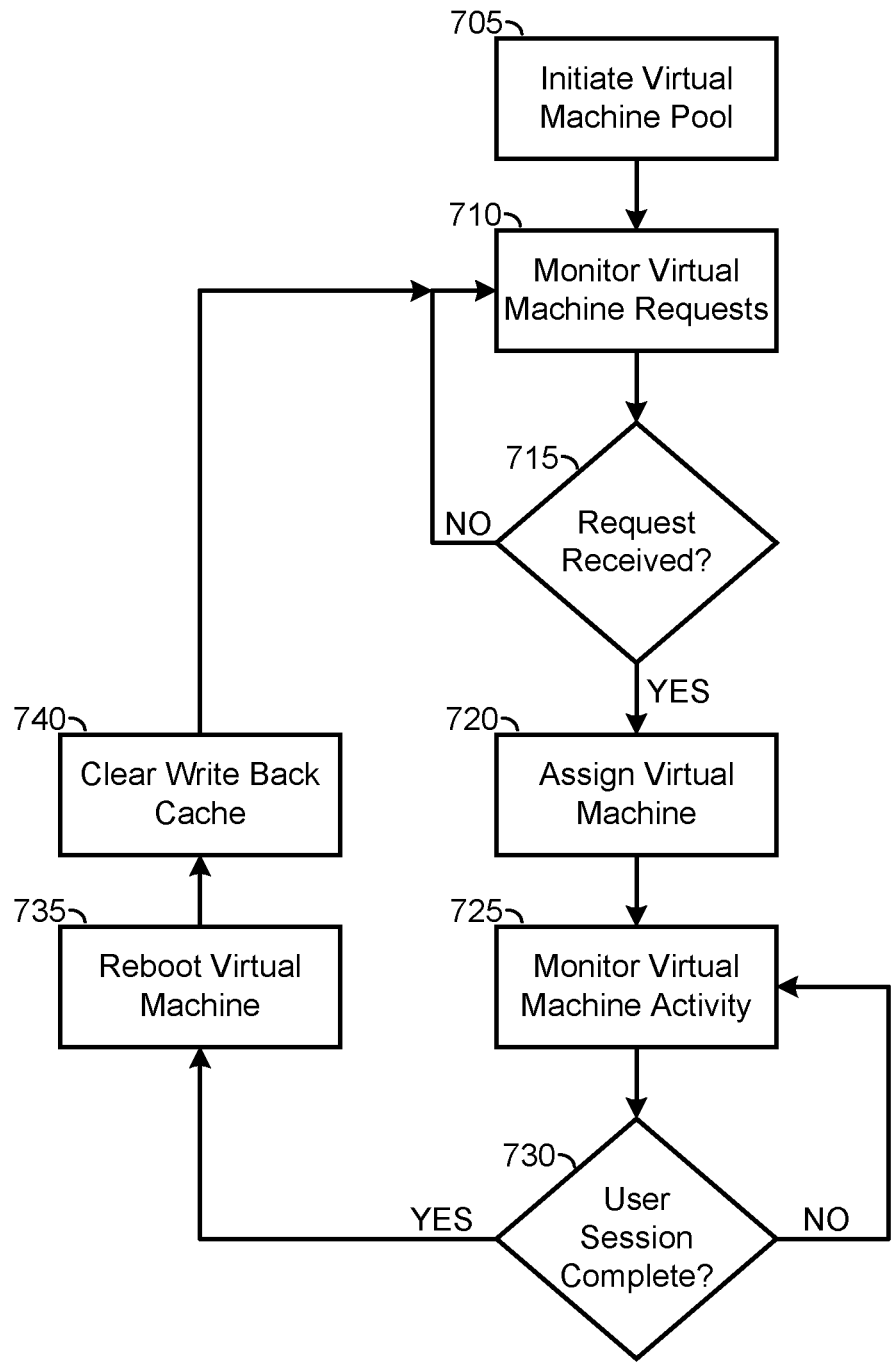
FIG. 7 is a flow diagram illustrating virtual machine pool management process, in accordance with at least one example of the present disclosure.

During the reboot process, a user session management system can perform various steps to quickly and securely reboot a virtual machine such that the virtual machine is returned to the virtual machine pool. For example, FIG. 7 illustrates a sample process 700 that includes initiating and monitoring a virtual machine computing session and, upon completion of the computing session, rebooting the virtual machine as described herein. An example of such a user session management system is the Citrix Virtual Apps and Desktops software as provided by Citrix Systems, Inc., of Fort Lauderdale, Fla.

For example, as shown in FIG. 7, a user session management system can initiate 705 a virtual machine pool. As described herein, initiating 705 the virtual machine pool can include accessing one or more copies of an OS image and storing the copies of the OS image on a set of system disks as described herein. The user session management system can maintain the virtual machine pool and monitor 710 incoming client traffic for a virtual machine request. If the user session management system determines 715 that a request for a virtual machine has been received, the user session management system can complete initialization of the virtual machine (e.g., launching any automatically-launched applications associated with the virtual machine) and assign 720 access to the virtual machine to the requesting user or user session application as described herein.

As further shown in FIG. 7, the user session management system can monitor 725 virtual machine activity during the computing session. Specific detail related to the computing session is provided above in the discussion of FIG. 5A. The user session management system can determine 730 if a particular computing session has completed. If the user session management system does not determine 730 that a computing session has completed, the user session management system can continue to monitor 725 the virtual machine activity. However, if the user session management system does determine 730 that a computing session has completed, the user session management system can reboot 725 the virtual machine. During rebooting, the hypervisor can access the original OS image as used before and reinitialize the virtual machine. During the rebooting process, the hypervisor can also clear 740 the write back cache as well as any local memory (e.g., memory cache 410), thereby deleting any session-specific information that may have been created by a user or a user session application during the computing session. However, the hypervisor can maintain the data contained in the allocated portion of the host cache (e.g., allocation portion of host cache 413). Depending upon the amount of content of the OS image that is stored in the allocated portion of the host cache, the hypervisor may be able to reboot the virtual machine directly from the host cache. The user session management system can then continue to monitor 710 for any virtual machine requests.

During the rebooting process as shown in FIG. 7, by using the original OS image the hydration process of a new OS image to a system disk is eliminated, thereby reducing the overall rebooting time required to restart a virtual machine that is being returned to the virtual machine pool after a computing session has concluded. By portioning and limiting all session specific data to either a local memory cache or a write back cache as described herein, changes to the system disk including a copy of the OS image are eliminated and the need for hydration of a new OS image to the system disk is removed. In certain examples, overall performance can be even further improved by loading some or all of the OS image from a local storage such as the allocated portion of the host cache as described herein, thereby limiting the content to be loaded from the system disk during reboot. Finally, enabling the reset of a virtual machine by rebooting the guest OS 130A rather than powering cycling the virtual machine eliminates the time required to power cycle the virtual machine.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A computer system for managing a virtual machine, the system comprising:
   a memory;
   a network interface; and
   at least one processor coupled to the memory and the network interface and configured to
   initiate a computing session for accessing a virtual machine by accessing an operating system image from a system disk,
   manage the computing session by monitoring read and write requests generated during the computing session,
   for write requests, write any requested information to at least one of a memory cache and a write back cache located separately from the system disk,
   for read requests for operating system image content, read the operating system image content from at least one of the system disk and a host cache operably coupled between the system disk and the at least one processor, the host cache configured to store a copy of the operating system image such that the copy of the operating system image is unaltered during the computing session,
   determine a completion of the computing session, and
   upon completion of the computing session
      clear the memory cache,
      clear the write back cache, and
      reboot the virtual machine using the copy of the operating system image stored in the host cache;

wherein the at least one processor is further configured to
determine whether a read request is for session-specific data or system data stored on at least one of the system disk and the host cache,
access at least one of the system disk and the host cache if the read request is for system data, and
access at least one of the memory cache and the write back cache if the read request is for session-specific data.

2. The computer system of claim 1, wherein the processor being configured to access at least one of the memory cache and the write back cache comprises the at least one processor being configured to:
determine whether the session-specific data is located on the memory cache or the write back cache;
access the memory cache and return the session-specific data if the at least one processor determines the session-specific data is on the memory cache; and
access the write back cache and return the session-specific data if the at least one processor determines the session-specific data is on the write back cache.

3. The computer system of claim 1, wherein the at least one processor is further configured to:
determine whether a memory cache is within a threshold of being filled; and
if the memory cache is within the threshold of being filled, copy data stored on the memory cache to the write back cache.

4. The computer system of claim 1, wherein the memory cache is stored on the memory coupled to the at least one processor and the write back cache is stored on a network memory coupled to the at least one processor via the network interface.

5. A method of managing a virtual machine, the method comprising:
initiating, by at least one processor, a computing session for accessing a virtual machine by accessing an operating system image from a system disk;
managing, by the at least one processor, the computing session by monitoring read and write requests generated during the computing session;
for write requests, writing, by the at least one processor, any requested information to at least one of a memory cache and a write back cache located separately from the system disk;
for read requests for operating system image content, reading the operating system image content from at least one of the system disk and a host cache operably coupled between the system disk and the at least one processor, the host cache configured to store a copy of the operating system image such that the copy of the operating system image is unaltered during the computing session;
for read requests for operating system image content that is not stored in the host cache, storing the requested operating system image content in the host cache;
determining, by the at least one processor, whether a read request is for session-specific data or system data stored on at least one of the system disk and the host cache;
accessing, by the at least one processor, at least one of the system disk and the host cache if the read request is for system data;
accessing, by the at least one processor, at least one of the memory cache and the write back cache if the read request is for session-specific data;
determining, by the at least one processor, a completion of the computing session; and
upon completion of the computing session
clearing, by the at least one processor, the memory cache and the write back cache, and
rebooting, by the at least one processor, the virtual machine using stored in the host cache.

6. The method of claim 5, wherein accessing at least one of the memory cache and the write back cache comprises:
determining, by the at least one processor, whether the session-specific data is located on the memory cache or the write back cache;
accessing, by the at least one processor, the memory cache and returning the session-specific data if the at least one processor determines the session-specific data is on the memory cache; and
accessing, by the at least one processor, the write back cache and returning the session-specific data if the at least one processor determines the session-specific data is on the write back cache.

7. The method of claim 5, further comprising:
determining, by the at least one processor, whether a memory cache is within a threshold of being filled; and
if the memory cache is within the threshold of being filled, copying, by the at least one processor, data stored on the memory cache to the write back cache.

8. The method of claim 5, wherein the memory cache is stored on a memory locally operably coupled to the at least one processor and the write back cache is stored on a network memory located remotely from the at least one processor and coupled to the at least one processor via a network interface.

9. A non-transitory computer readable medium storing computer executable instructions to manage a virtual machine, the computer executable instructions comprising instructions to:
initiate a computing session for accessing a virtual machine by accessing an operating system image from a system disk operably coupled to at least one processor;
manage the computing session by monitoring read and write requests generated during the computing session;
for write requests, write any requested information to at least one of a memory cache and a write back cache located separately from the system disk;
for read requests for operating system image content, reading the operating system image content from at least one of the system disk and a host cache operably coupled between the system disk and the at least one processor, the host cache configured to store a copy of the operating system image such that the copy of the operating system image is unaltered during the computing session;
for read requests for operating system image content that is not stored in the host cache, store the requested operating system image content in the host cache;
determine whether a read request is for session-specific data or system data stored on at least one of the system disk and the host cache;
access at least one of the system disk and the host cache if the read request is for system data;
access at least one of the memory cache and the write back cache if the read request is for session-specific data;
determine a completion of the computing session; and
upon completion of the computing session
clear the memory cache and the write back cache, and
reboot the virtual machine using the copy of the operating system image stored in the host cache.

10. The computer readable medium of claim 9, wherein the instructions to access at least one of the memory cache and the write back cache if the read request is for session-specific data comprise instructions to:
- determine whether the session-specific data is located on the memory cache or the write back cache;
- access the memory cache and return the session-specific data if the at least one processor determines the session-specific data is on the memory cache; and
- access the write back cache and return the session-specific data if the at least one processor determines the session-specific data is on the write back cache.

11. The computer readable medium of claim 9, wherein the instructions further comprise instructions to:
- determine whether a memory cache is within a threshold of being filled; and
- if the memory cache is within the threshold of being filled, copy data stored on the memory cache to the write back cache.

12. The computer readable medium of claim 11, wherein the memory cache is stored on a memory locally operably coupled to the at least one processor and the write back cache is stored on a network memory located remotely from the at least one processor and coupled to the at least one processor via a network interface.

* * * * *